United States Patent
Burnett et al.

(10) Patent No.: US 10,118,481 B1
(45) Date of Patent: Nov. 6, 2018

(54) FUEL HOUSING ASSEMBLIES HAVING FUEL NOZZLE BOOT DEFLECTOR ASSEMBLIES

(71) Applicant: Toyota Motor Engineering & Manufacturing North America, Inc., Erlanger, KY (US)

(72) Inventors: Brandon W. Burnett, Ypsilanti, MI (US); Corey B. Sargent, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/622,940

(22) Filed: Jun. 14, 2017

(51) Int. Cl.
*B60K 15/04* (2006.01)
*B60K 15/05* (2006.01)

(52) U.S. Cl.
CPC ............. *B60K 15/04* (2013.01); *B60K 15/05* (2013.01); *B60K 2015/053* (2013.01); *B60K 2015/0553* (2013.01); *B60K 2015/0576* (2013.01); *B60K 2015/0584* (2013.01)

(58) Field of Classification Search
CPC  B60K 15/04; B60K 15/05; B60K 2015/0584; B60K 2015/0561
USPC ..................................................... 296/97.22
See application file for complete search history.

(56) References Cited

U.S. PATENT DOCUMENTS

| | | | |
|---|---|---|---|
| 5,884,958 A * | 3/1999 | Oddenino | B60K 15/04 296/97.22 |
| 5,936,500 A * | 8/1999 | Martus | B60K 15/05 335/229 |
| 6,189,959 B1 * | 2/2001 | VanAssche | B60K 15/05 16/86 B |
| 6,234,556 B1 * | 5/2001 | Janssen | B60K 15/05 296/97.22 |
| 8,167,010 B2 | 5/2012 | Yoshida | |
| 8,616,609 B2 * | 12/2013 | Ogata | B60K 15/05 296/97.22 |
| 2002/0145303 A1 * | 10/2002 | Son | B60K 15/05 296/97.22 |
| 2004/0021271 A1 | 2/2004 | Tratnik | |
| 2013/0134737 A1 * | 5/2013 | Ogata | B60K 15/05 296/97.22 |

FOREIGN PATENT DOCUMENTS

| | | | |
|---|---|---|---|
| DE | 3504466 | * | 3/1986 |
| JP | 2001158244 A | | 6/2001 |
| KR | 20070055146 A | | 5/2007 |
| KR | 20070102135 A | | 10/2007 |
| KR | 20120136749 A | | 12/2012 |
| WO | 2009104814 A1 | | 8/2009 |

* cited by examiner

*Primary Examiner* — Dennis H Pedder
(74) *Attorney, Agent, or Firm* — Dinsmore & Shohl LLP (57) ABSTRACT

A fuel housing assembly for a vehicle includes a fuel housing having a sidewall and an interior wall defining a fuel nozzle receiving cavity for receiving a fuel nozzle having a fuel nozzle boot. A fuel door locking assembly having a locking pin moveable between an extended position and a retracted position. A deflector assembly having a base portion and a deflector. The base portion is connected to the sidewall. The deflector extends outwardly from the base portion to extend beyond the locking pin to deflect the fuel nozzle boot from contacting the locking pin with the locking pin in the extended position.

20 Claims, 6 Drawing Sheets

FUEL HOUSING ASSEMBLIES HAVING FUEL NOZZLE BOOT DEFLECTOR ASSEMBLIES

TECHNICAL FIELD

The present specification generally relates to fuel housing assemblies and, more specifically, to fuel housing assemblies that include deflector assemblies that deflect a fuel nozzle boot.

BACKGROUND

It is known to provide a locking feature on fuel doors of vehicles to inhibit opening of the fuel door and prevent access to fuel within a vehicle fuel tank. The known locking features typically include a locking member located in a fuel housing that is moveable between locked and unlocked positions. When the fuel door is closed, a portion of the fuel door engages with the locking member to move the locking member from the unlocked position to the locked position.

During fueling operation, a fuel nozzle having a fuel nozzle boot is inserted into the fuel housing. The fuel nozzle boot of the fuel nozzle can contact the locking member to move the locking member from the unlocked position to the locked position due to the size of the fuel nozzle boot. Upon completion of the fueling operation and movement of the fuel door to the closed position, the locking feature of the fuel door may not engage the locking member as the locking member has already been moved into the locked position by the fuel nozzle boot. A user may then need to move the fuel door from a closed position to an open position, manually toggle the locking member from the locked position to the unlocked position and then reclose the fuel door in order to engage the locking feature into the locked position.

Accordingly, there is a need for a fuel housing assembly capable of preventing the fuel nozzle boot from contacting and moving the locking member into the locked position while the fuel door is open.

SUMMARY

In one embodiment, a fuel housing assembly for a vehicle includes a fuel housing, a fuel door locking assembly and a deflector assembly. The fuel housing includes a sidewall and an interior wall defining a fuel nozzle receiving cavity for receiving a fuel nozzle having a fuel nozzle boot. A fuel door locking assembly having a locking pin moveable between an extended position and a retracted position. A deflector assembly having a base portion and a deflector. The base portion is connected to the sidewall. The deflector extends outwardly from the base portion to extend beyond the locking pin to deflect the fuel nozzle boot from contacting the locking pin with the locking pin in the extended position.

In another embodiment, a fuel housing assembly for a vehicle includes a fuel door, a fuel housing, a fuel door locking assembly, and a deflector assembly. The fuel door includes a locking plate. The fuel housing includes a sidewall and an interior wall defining a fuel nozzle receiving cavity for receiving a fuel nozzle having a fuel nozzle boot. The fuel door locking assembly includes a locking pin. The fuel door locking assembly having a locked configuration and an unlocked configuration. In the locked configuration the locking pin is in a retracted position and engaged with the locking plate to inhibit opening of the fuel door. In the unlocked position the locking pin is in an extended position and disengaged from the locking plate to allow opening of the fuel door. The deflector assembly includes a base portion and a deflector. The base portion is connected to the sidewall. The deflector extends outwardly from the base portion to extend beyond the locking pin to deflect the fuel nozzle boot from contacting the locking pin with the locking pin in the extended position.

In another embodiment, a vehicle includes a fuel door, a body panel, a fuel housing, a fuel door locking assembly, a body panel, a fuel housing, and a deflector assembly. The fuel door includes a locking plate. The fuel door locking assembly includes a locking pin. The fuel door locking assembly having a locked configuration and an unlocked configuration. In the locked configuration the locking pin is in a retracted position and engaged with the locking plate to inhibit opening of the fuel door. In the unlocked position the locking pin is in an extended position and disengaged from the locking plate to allow opening of the fuel door. The fuel housing is connected to the body panel. The fuel housing includes a sidewall and an interior wall defining a fuel nozzle receiving cavity for receiving a fuel nozzle having a fuel nozzle boot. The deflector assembly includes a base portion and a deflector. The base portion is connected to the sidewall. The deflector extends outwardly from the base portion to extend beyond the locking pin to deflect the fuel nozzle boot from contacting the locking pin with the locking pin in the extended position.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally relate to fuel housing assemblies for vehicles that include deflector assemblies that deflect fuel nozzle boots of fuel nozzles from contacting locking pins of fuel door locking assemblies when the fuel nozzles are inserted into the fuel housing assemblies. The deflector assemblies generally include a base portion and a deflector. The base portion is connected to a sidewall of a fuel housing. The deflector extends outwardly from the base portion to extend beyond the locking pin to deflect the fuel nozzle boot from contacting the locking pin with the locking pin in an extended position.

The fuel housing assemblies are provided with fuel door locking assemblies that are moveable between a locked configuration and an unlocked configuration. In the locked configuration, the fuel door locking assemblies can inhibit the fuel doors from opening. In the unlocked configuration, the fuel door locking assemblies can allow the fuel doors to move from a closed position to an open position.

In some embodiments, the locking pin engages with a portion of the fuel door to place the fuel door locking assemblies in the locked configuration. The locking pin disengages with the portion of the fuel door to place the fuel door locking assemblies in the unlocked position. As will be described in greater detail below, the locking pin is moveable between a retracted position and an extended position. In the extended position, the locking pin extends outwardly outboard in a vehicle-lateral direction farther than the locking pin extends in the retracted position.

In the locked configuration, the locking pin is in the retracted position and engages with the portion of the fuel door to prevent opening of the fuel door. The engagement between the locking pin and the portion of the fuel door prevents the movement of the fuel door from the closed position to the open position.

In the unlocked configuration, the locking pin is in the extended position and is disengaged with the portion of the fuel door to allow for the fuel door to move from the closed position to the open position. The disengagement of the locking pin from the portion of the fuel door allows the movement of the fuel door from the closed position to the open position.

In order for the locking pin to engage the portion of the fuel door, the locking pin is required to be positioned in the extended position. In other words, the locking pin may not engage the portion of the fuel door with the locking pin in the retracted position. For example, when the locking pin is in the extended position, the movement of the fuel door from the open position to the closed position engages the locking pin with the portion of the fuel door to move the locking pin from the extended position into the retracted position. Therefore, the fuel door locking assembly is moved from the unlocked configuration into the locked configuration.

The locking pin is retained in the retracted position until movement of the fuel door from the closed position with the locking pin in the retracted position to the open position or the signal from electronic control unit to move the fuel locking assembly from locked position to the unlocked position. Therefore, when the locking pin is in the retracted position, due to contact with a fuel nozzle boot of a fuel nozzle during fueling operation, the movement of the fuel door from the open position to the closed position can fail to properly engage the locking pin with the portion of the fuel door. As the locking pin fails to properly engage the portion of the fuel door, the movement of the fuel door from the open position to the closed position fails to properly move the fuel door locking assembly from the unlocked configuration to the locked configuration. Therefore, the locking pin is required to be moved from the retracted position to the extended position either manually engaging the locking pin from the retracted position to the extended position or by or the signal from the electronic control unit to move the fuel door locking assembly from the locked configuration to the unlocked configuration.

The embodiments disclosed herein may be configured to deflect the fuel nozzle boot of the fuel nozzle from contacting and engaging fuel door locking assemblies during fueling operation. Inhibiting the contact and engagement of the fuel nozzle boot with the fuel door locking assembly during fueling operation, can inhibit the locking pin from being moved from the extended position to the retracted position while the fuel door is open and the fuel door locking assembly is in the unlocked position. The various components of fuel housing assemblies will be described in more detail herein with specific reference to the corresponding drawings.

Coordinate axes are included in the drawings in order to provide a frame of reference for various components of the console assemblies. As used herein, the phrase "vehicle-longitudinal direction" refers to the forward-rearward direction (i.e., the +/−Z direction of the coordinate axes in the figures). The phrase "vehicle-vertical direction" refers to the upward-downward direction (i.e., the +/−Y direction of the coordinate axes in the figures). The phrase "vehicle-lateral direction" refers to the left-right direction (i.e., the +/−X direction of the coordinate axes in the figures). Further, the terms "inboard" and "outboard" are used to describe the relative positioning of various components of the vehicle with respect to a centerline of the vehicle.

Figure 1A:
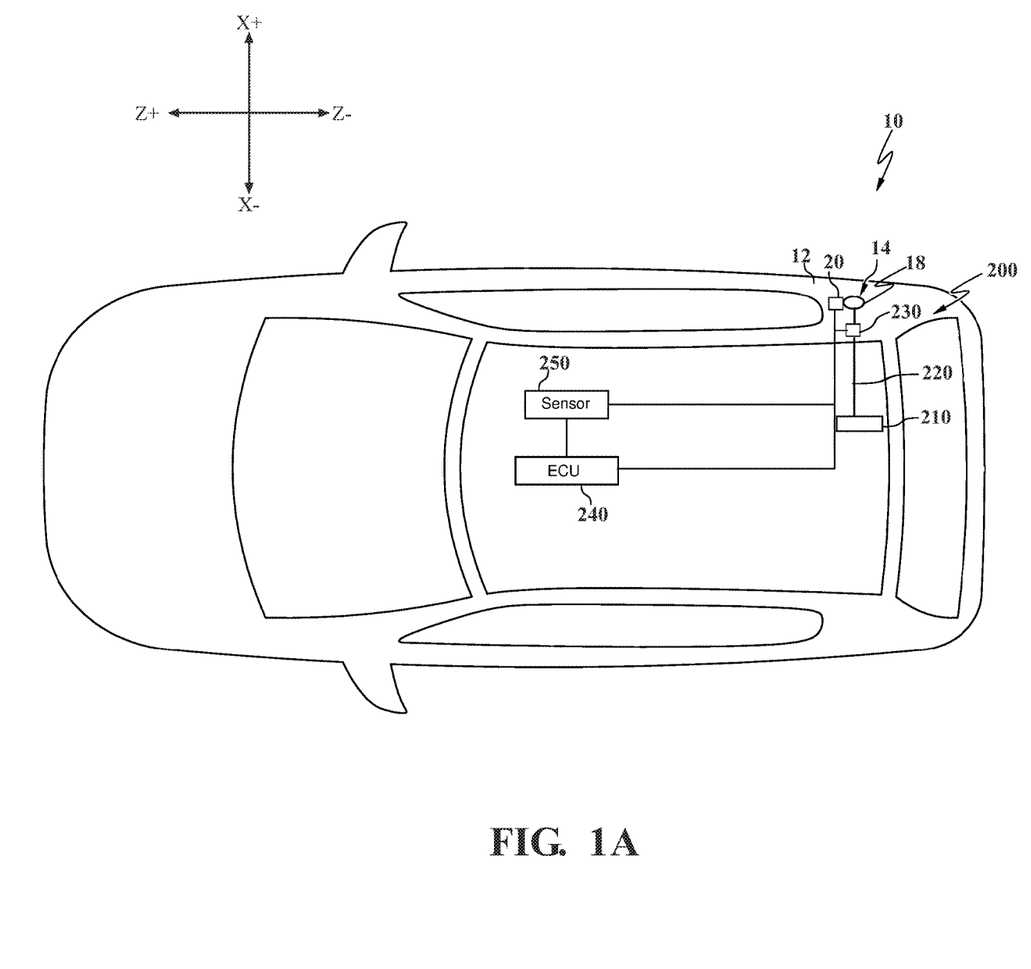
FIG. 1A schematically depicts a vehicle having a fuel tank assembly and a electronic control unit, according to one or more embodiments described herein.
Figure 1B:
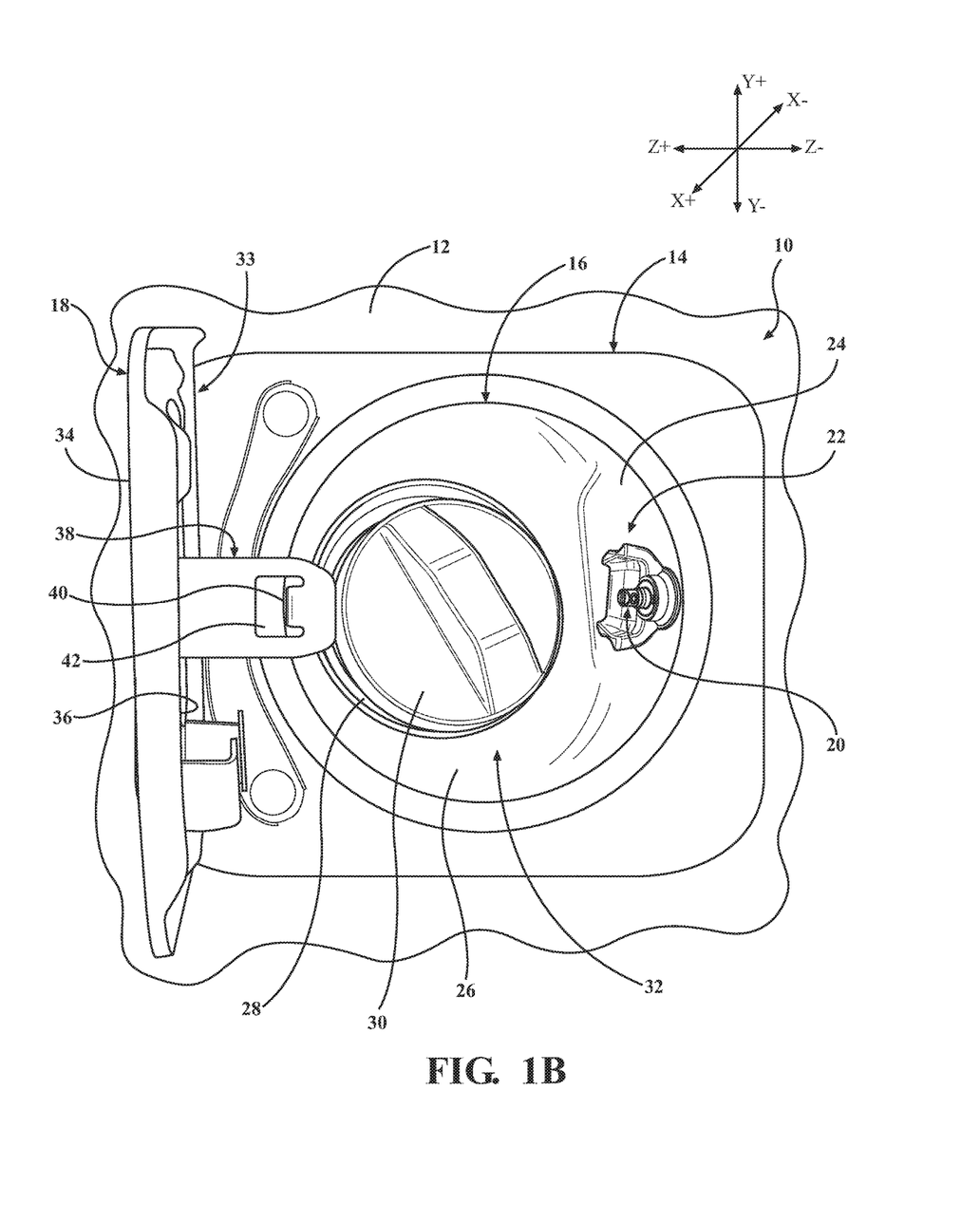
FIG. 1B schematically depicts a partial perspective side view of the vehicle having a fuel housing assembly, according to one or more embodiments described herein.

Referring to FIGS. 1A and 1B, a vehicle 10 includes a body panel 12 having a fuel housing assembly 14 attached thereto. The fuel housing assembly 14 includes a fuel housing 16, a fuel door 18, a fuel door locking assembly 20, and a deflector assembly 22. The fuel housing 16 includes a sidewall 24 and an interior wall 26. A fuel nozzle opening 28 is provided in the interior wall 26. A fuel cap 30 is releasably secured to the fuel nozzle opening 28. The sidewall 24 and the interior wall 26 define a fuel nozzle receiving cavity 32. As will be described in greater detail below, the fuel nozzle receiving cavity 32 is configured for receiving a fuel nozzle.

The vehicle 10 includes a fuel tank assembly 200 having a fuel tank 210 and a fuel inlet passage 220 that connects the fuel tank 210 to the fuel nozzle opening 28 of the fuel housing assembly 14. A fuel shut off valve 230 is provided on the fuel inlet passage 220. The fuel shut off valve 230 is moveable between an open position and a closed position. In the open position, fuel is allowed to pass through the fuel shut off valve 230 from the fuel nozzle opening 28 into the fuel tank 210. In the closed position, fuel is inhibited to pass through the fuel shut off valve 230 from the fuel nozzle opening 28 to the fuel tank 210. Specifically, the fuel shut off valve blocks access to the fuel tank 210 from the fuel nozzle opening 28 by closing the fuel inlet passage 220.

The vehicle 10 further includes an electronic control unit (ECU) 240 and a fuel door position sensor 250. The electronic control unit 240 and the fuel door position sensor 250 are in communication with the fuel door locking assembly 20. In some embodiments, the fuel locking assembly 20 receives a signal from the electronic control unit 240 to switch between a locked configuration or an unlocked configuration.

In other embodiments, the fuel locking assembly 20 switches from the locked configuration to the unlocked configuration upon movement of the fuel door 18 from the closed position to the open position and the fuel locking assembly 20 switches from the unlocked configuration to the locked configuration upon movement of the fuel door 18 from the open position to the closed position as will be described in greater detail below.

The electronic control unit 240 may communication wirelessly with a remote lock control device to determine whether a suitable lock or unlock signal has been received. The remote lock control device may be, for example, a remote wireless key and/or a mobile device such as a personal digital assistant, a laptop computer, a cellular phone or some other mobile device.

The fuel door 18 is attached to the fuel housing 16 by a hinge mechanism 33. The hinge mechanism 33 optionally includes a biasing member (i.e. spring) that biases the fuel door 18 toward the open position, as shown in FIG. 1B, when moved from a closed position towards the open position. Similarly, the biasing member of the hinge mechanism 33 biases the fuel door 18 toward the closed position when moved from the open position toward the closed position. The fuel door 18 is optionally moveable between the open position and the closed position by a manual operation of a user.

The fuel door 18 includes a fuel door outer portion 34 and an opposite fuel door inner portion 36. In some embodiments, the fuel door outer portion 34 is configured to correspond to the body panel 12 of the vehicle 10. The fuel door inner portion 36 includes a locking plate 38 for engaging with the fuel door locking assembly 20. The locking plate 38 includes a locking striker 40 and an aperture 42.

Figure 2:
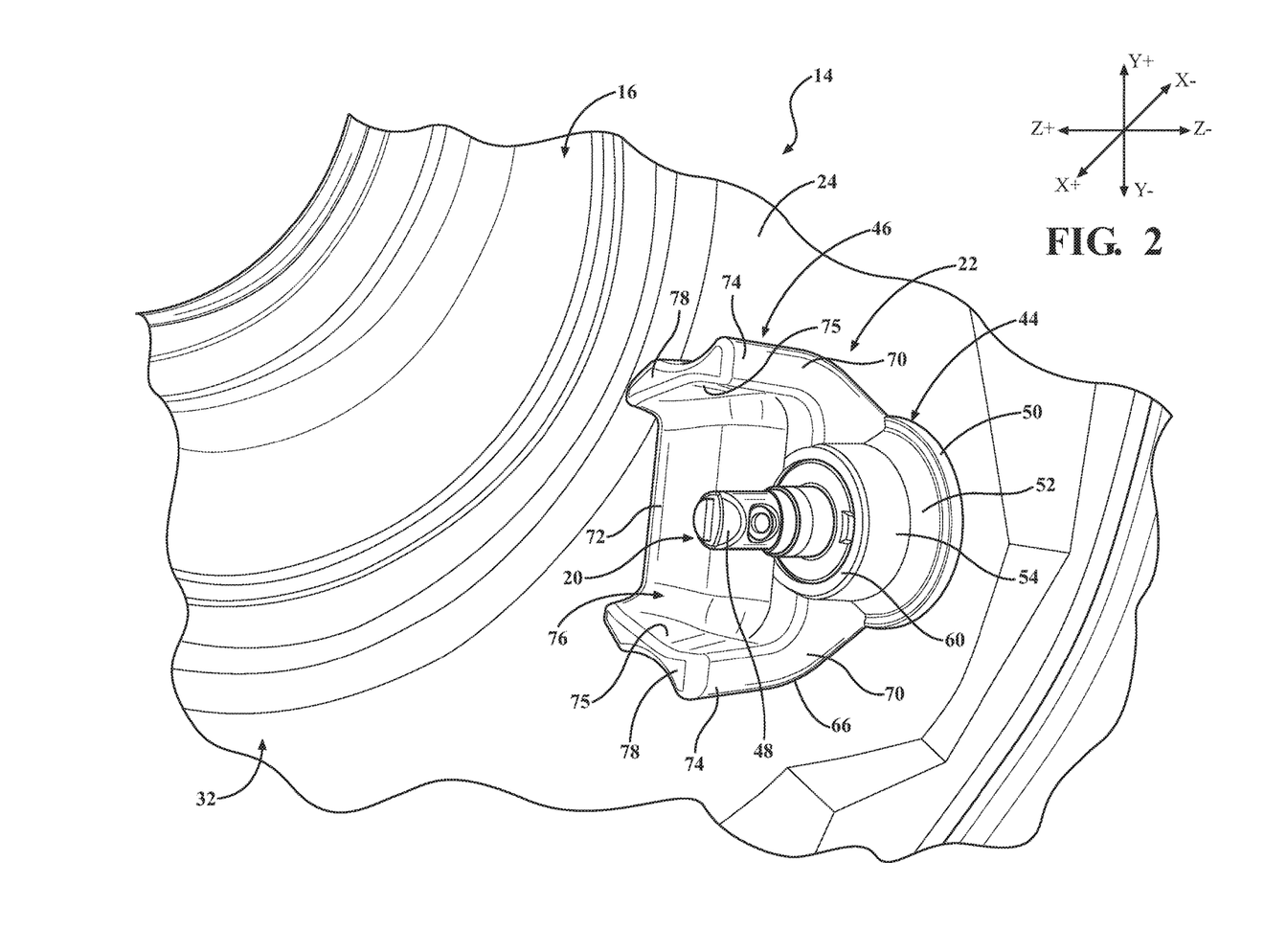
FIG. 2 schematically depicts a partial perspective side view of the fuel housing assembly of FIG. 1B with a fuel door in an open position, according to one or more embodiments described herein.

Referring to FIGS. 1A-1B and 2, the deflector assembly 22 includes a base portion 44 and a deflector 46. The deflector assembly 22 is provided on the sidewall 24 of the fuel housing 16. The deflector assembly 22 is provided to partially surround a locking pin 48 of the fuel door locking assembly 20. The locking pin 48 is moveable between an extended position and a retracted position. As will be described in greater detail below, the fuel door locking assembly 20 is in an unlocked configuration when the locking pin 48 is in the extended position and the fuel door locking assembly 20 is in a locked configuration when the locking pin 48 is in the retracted position and engaged with the fuel door 18.

The electronic control unit 240 is configured to control the fuel door locking assembly 20 to lock and unlock the fuel door lock assembly 20 in any number of ways. For example, the electronic control unit 240 may energize and de-energize an electromechanical device, such as a solenoid, connected to the locking pin 48 to move the fuel door locking assembly 20 between the locked configuration and the unlocked configuration by moving the locking pin 48 between the extended position or the retracted position. In some embodiments, the electronic control unit 240 may control activation and rotation of an electric motor that drives a rack-and-pinion gear set that is connected to the locking pin 48 to move the fuel door locking assembly 20 between the locked configuration and the unlocked configuration by moving the locking pin 48 between the extended position or the retracted position.

The electronic control unit 240 and the fuel door position sensor 250 determines the position of the fuel door 18 based on the position of the locking pin 48. Specifically, the fuel door position sensor 250 detects whether the locking pin 48 is in the extended position or the retracted position. The fuel door position sensor 250 outputs a signal to the electronic control unit 240 based position of the locking pin 48.

The electronic control unit 240 includes a processor and a memory unit that is coupled to the processor. The memory unit stores logic that, when executed by the processor, causes the electronic control unit 240 to determine whether the position of the fuel door 18 based on the output of the fuel door position sensor 250. Specifically, the electronic control unit 240 determines that the fuel door 18 is in the open position when the locking pin 48 is in the extended position and determines that the fuel door 18 is in the closed position when the locking pin 48 is in the retracted position.

In response to determining that the fuel door 18 is in the closed position for a predetermined period of time, based on the locking pin 48 being in the retracted position for the predetermined period of time, the electronic control unit 240 controls the fuel shut off valve 230 to move from the open position to the closed position. Similarly, in response to determining that the fuel door 18 is in the open position, based on the locking pin 48 being in the extended position, the electronic control unit 240 controls the fuel shut off valve 230 to move from the closed position to the open position.

With reference to FIGS. 2 and 3A-3C, the deflector assembly 22 will be described in greater detail. The base portion 44 of the deflector assembly 22 includes a base 50, a tapered portion 52, and a collar 54. The base 50 includes a wall surface 56. The tapered portion 52 extends outwardly from the base 50 opposite the wall surface 56. The base portion 44 is semicircular in shape and includes a bore 58 that extends from an upper edge 60 of the collar 54 to the wall surface 56 of base 50. A pair of tabs 62 extend radially inward from an inner surface 64 of the bore 58. As will be discussed in greater detail below, the locking pin 48 is slidably received within the bore 58.

Figures 3A, 3B, 3C:
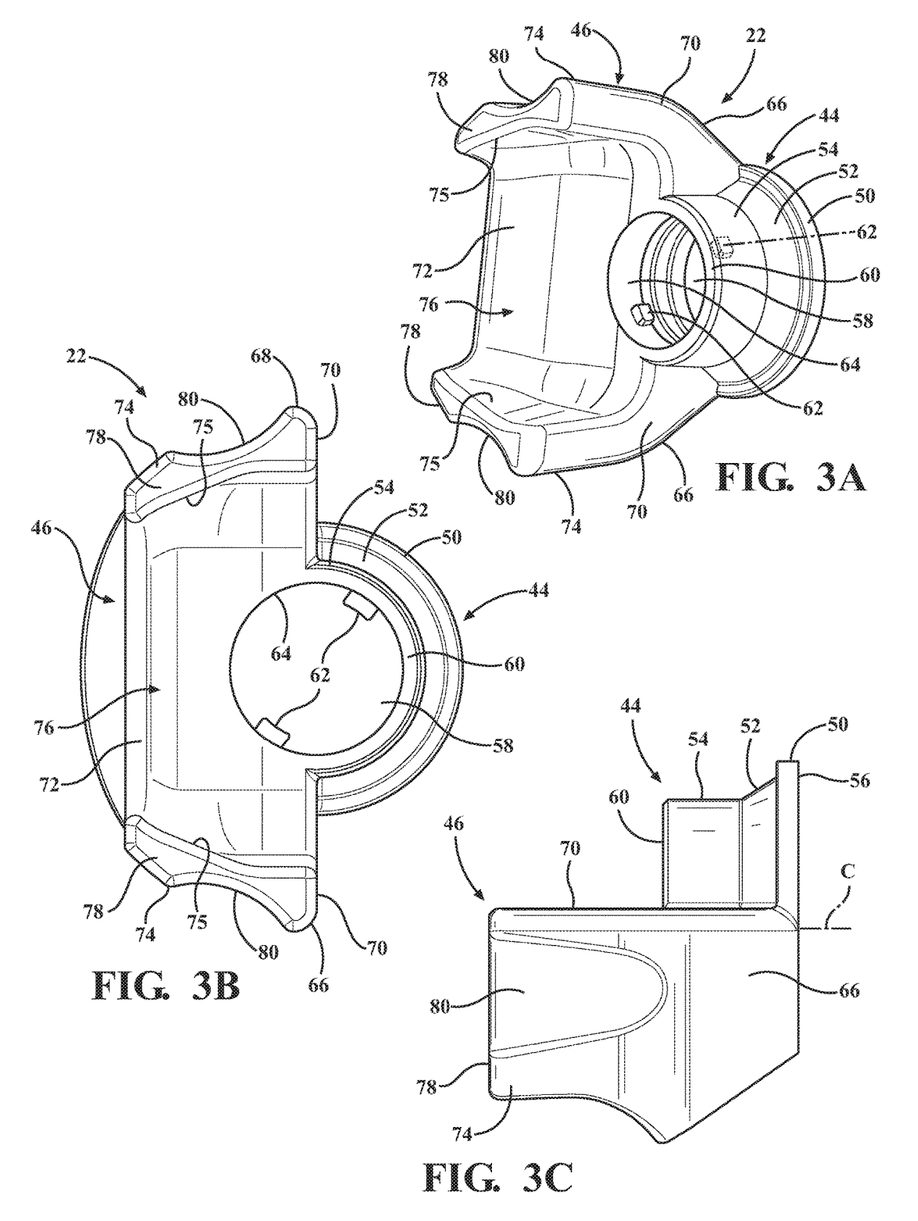
FIG. 3A schematically depicts a perspective view of a deflector assembly of the fuel housing assembly of FIG. 1B, according to one or more embodiments shown and described herein.
FIG. 3B schematically depicts a top view of a deflector assembly of the fuel housing assembly of FIG. 1B, according to one or more embodiments shown and described herein.
FIG. 3C schematically depicts a side view of a deflector assembly of the fuel housing assembly of FIG. 1B, according to one or more embodiments shown and described herein.

The deflector 46 includes an offset portion 66 that extends outwardly from the base portion 44. The offset portion 66 is formed so as to at least partially surround the bore 58. The offset portion 66 extends outwardly from the base 50. The offset portion 66 includes a plate surface 72 that extends substantially planar with the upper edge 60 of the collar 54. The deflector 46 also includes a pair of ribs 74 are formed so as to extend outwardly beyond the plate surface 72 of the offset portion 66.

The offset portion 66 and the pair of ribs 74 form a contact surface 70. The contact surface 70 is positioned adjacent the base 50, the tapered portion 52, and the collar 54. The pair of ribs 74 extend generally normal to a center axial direction C of the bore 58 so as to extend beyond a diameter of the bore 58. The pair of ribs 74 are spaced apart such that one of the pair of ribs 74 does not contact the other of the pair of ribs 74. The plate surface 72 traverses the space between the pair of ribs 74. Each of the pair of ribs 74 include distal ends 78 that are spaced apart from the plate surface 72 of the offset portion 66 and the upper edge 60 of the bore 58.

A recess 80 is formed on an exterior side of each of the pair of ribs 74. The recesses 80 aid in the attachment of the deflector assembly 22 to sidewall 24 by providing gripping locations that can be used in positioning the deflector assembly 22.

Figure 4:
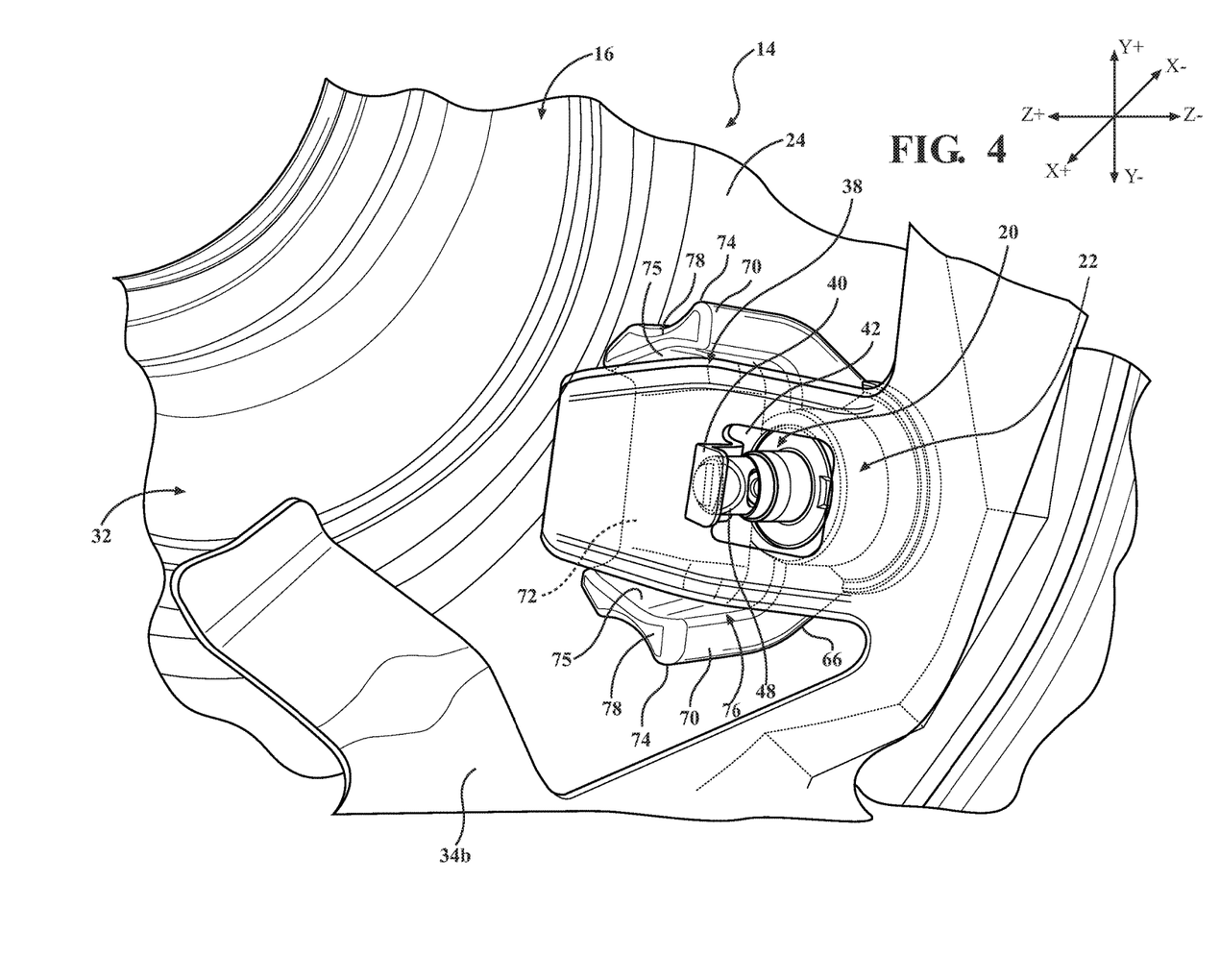
FIG. 4 schematically depicts a partial perspective side view of the fuel housing assembly of FIG. 1B with the fuel door in a closed position, according to one or more embodiments shown and described herein.

With reference to FIG. 4, the fuel door 18 is in the closed position and the locking striker 40 engages with the locking pin 48. Specifically, the locking striker 40 engages the locking pin 48 such that the locking pin 48 is received within the aperture 42. The engagement of the locking plate 38 with the locking pin 48 places the fuel door locking assembly 20 in the locked configuration with the locking pin 48 in the retracted position. In the retracted position, a distance that the locking pin 48 extends outwardly from the sidewall 24 is reduced compared to a distance that the locking pin extends outwardly from the sidewall 24 in the extended position as seen in FIG. 2.

As shown in FIG. 4, in the locked configuration, a portion of the locking plate 38 is received within the deflector 46 of the deflector assembly 22. Specifically, the pair of ribs 74 are spaced apart a predetermined distance so as to define a locking plate cavity 76. The locking plate cavity 76 is defined between interior surfaces 75 of the pair of ribs 74 and the plate surface 72. The locking plate cavity 76 is configured to receive a portion of the locking plate 38 such that side edges of the locking plate 38 are positioned within the locking plate cavity 76 and between the interior surfaces 75 of the pair of ribs 74.

Figure 5:
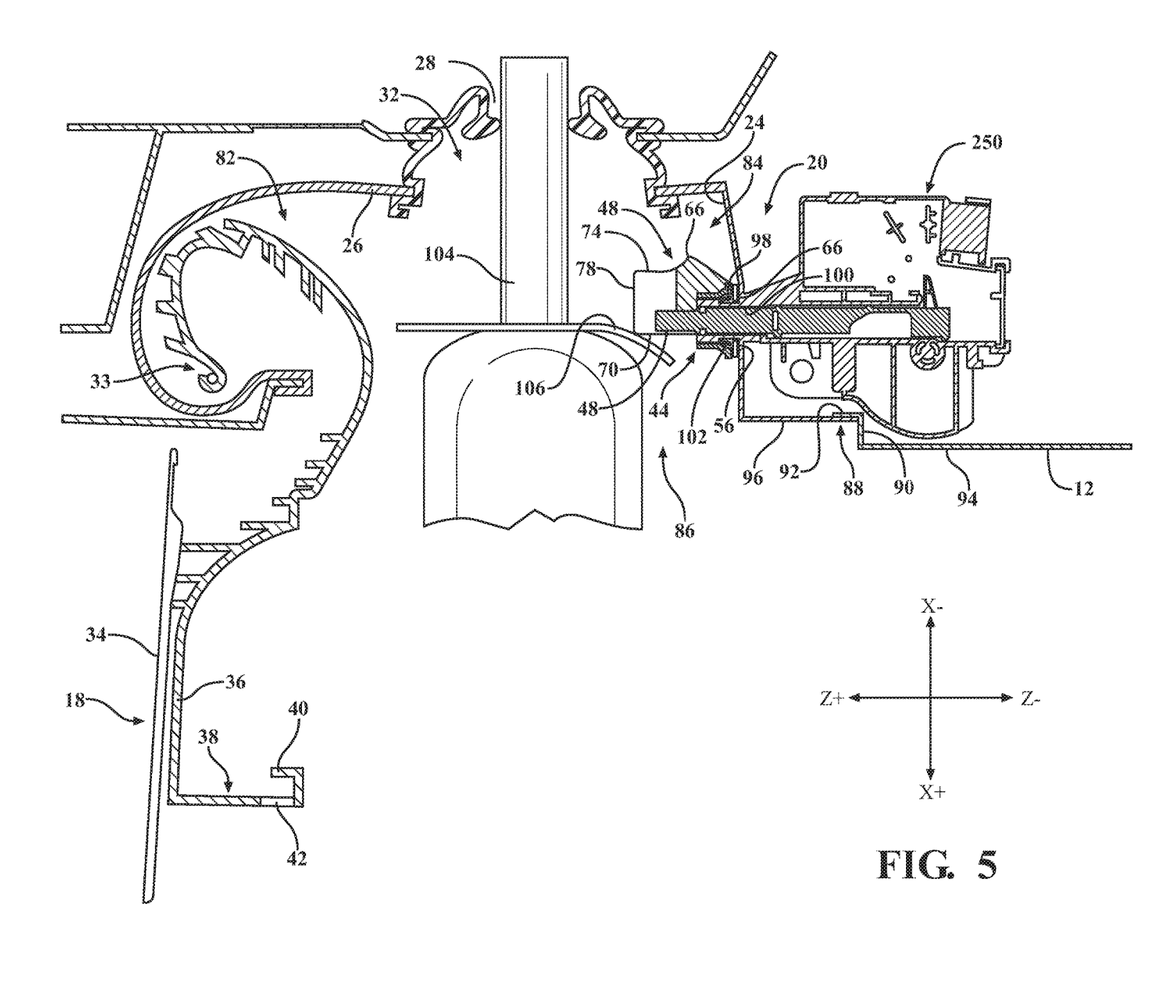
FIG. 5 schematically depicts a partial cross-sectional of the fuel housing assembly of FIG. 1B with the fuel door in the open position and a fuel nozzle inserted therein, according to one or more embodiments shown and described herein.

Referring to FIG. 5, the fuel housing 16 may be somewhat irregular in shape having a front section 82 and a rear section 84. The front section 82 is shaped to accommodate the hinge mechanism 33. The rear section 84 receives the locking pin 48 of the fuel door locking assembly 20. In the illustrated embodiment, the fuel housing 16 is secured within an aperture 86 of the body panel 12 of the vehicle 10. The body panel 12 may be formed of a sheet metal which has a pocket 88 for accepting the fuel housing 16.

In some embodiments, the pocket 88 of the body panel 12 includes an inwardly extending wall portion 90 and a frontward extending wall portion 92. The inwardly extending wall portion 90 that extends in the vehicle widthwise direction from an outer facing portion 94 of the body panel 12. The frontward extending wall portion 92 extends in the vehicle lengthwise direction from the inwardly extending wall portion 90. The fuel housing 16 may include a connecting portion 96 that connects the frontward extending wall portion 92 of the body panel 12 to the fuel housing 16. Any suitable connecting structure may be used for connecting the fuel housing 16 to the body panel 12, such as clips, fasteners, clamps and the like.

The fuel housing 16 includes a retainer 98 that extends outwardly beyond the sidewall 24. The retainer 98 is generally tube shaped and includes a through-hole 100 through which the locking pin 48 is slidingly received. A pair of channels 102 are formed on an exterior surface of the retainer 98. The deflector assembly 22 is attached to the retainer 98 by the engagement of the pair of tabs 62, which extend radially inwardly from the inner surface 64 of the bore 58, within the pair of channels 102 of the retainer 98 (FIGS. 3A-3C).

The retainer 98 may be formed integrally with the fuel housing 16 and extends outwardly from an outer surface of the sidewall 24 in the lengthwise direction of the vehicle 10. In one embodiment, the retainer 98 may be molded integrally with the fuel housing 16 so that the retainer 98 and the fuel housing 16 are a single component. In other embodiments, the retainer 98 may be formed separately and attached to the fuel housing 16.

As shown in FIG. 5, the fuel door 18 is in the open position and a fuel nozzle 104 is received within the fuel nozzle receiving cavity 32 of the fuel housing 16. Specifically, the fuel nozzle 104 is inserted within the fuel nozzle opening 28. The fuel nozzle 104 includes a fuel nozzle boot 106. The fuel nozzle boot 106 extends radially outwardly from the fuel nozzle 104.

As the fuel door 18 is in the open position, the fuel door locking assembly 20 is in an unlocked configuration in which the locking pin 48 is in an extended position. The distal ends 78 of the pair of ribs 74 extend beyond the locking pin 48 in the forward vehicle lengthwise direction. The contact surface 70 of the pair of ribs 74 and the offset portion 66 extend outboard beyond the locking pin 48 in the vehicle-lateral direction. As the distal ends 78 and the contact surfaces 70 of the pair of ribs 74 extend outboard beyond the locking pin 48 in the vehicle-lateral direction, the fuel nozzle boot 106 is prevented from contacting the locking pin 48 as the fuel nozzle 104 is inserted into the fuel nozzle receiving cavity 32.

As such, the fuel nozzle boot 106 is deflected by the deflector 46 due to the position of the pair of ribs 74 outboard of at least a portion of the locking pin 48 in the vehicle-lateral direction. Specifically, the position of the distal ends 78 of the pair of ribs 74 and the contact surface 70 of the pair of ribs 74 and the offset portion 66 outboard of at least a portion of the locking pin 48 in the vehicle-lateral direction deflects the fuel nozzle boot 106 from contacting the locking pin 48. As the deflector 46 deflects the fuel nozzle boot 106 from contacting the locking pin 48 when the locking pin 48 is in the extended position during fueling operation, the locking pin 48 is retained in the extended position during the fueling operation. As the locking pin 48 is retained in the extended position during the fueling operation, the fuel door position sensor 250 detects the that the locking pin 48 is in the extended position and the electronic control unit 240 determines that the fuel door 18 is in the open position. Accordingly, the electronic control unit 240 controls the fuel shut off valve 230 to be maintained in the open position during the fueling operation. Therefore, the fuel shut off valve 230 is prevented from being moved from the open position to the closed position during fueling operation due to the contact between the fuel nozzle boot 106 and the locking pin 48 as the fuel nozzle boot 106 is deflected by the deflector 46 from contacting the locking pin 48.

The deflector assembly 22 is provided to partially surround the locking pin 48 to block contact with the fuel nozzle boot 106 and allow for closing operation of the fuel door 18. Specifically, the locking plate cavity 76 is configured to receive a portion of the locking plate 38 such that side edges of the locking plate 38 are positioned within the locking plate cavity 76 and between the interior surfaces 75 of the pair of ribs 74. As such, the locking plate 38 can properly engage the locking pin 48 to move the locking pin 48 from the extended position to the retracted position to move the fuel door locking assembly 20 from the unlocked configuration to the locked configuration upon movement of the fuel door 18 from the open position to the closed position.

During fueling operation, in which the fuel nozzle 104 is inserted into the fuel nozzle opening 28, the fuel nozzle boot 106 contacts the deflector assembly 22 which deflects contact with and inhibits movement of the locking pin 48 from the extended position in the unlocked configuration to the retracted position in the locked configuration, as shown in FIG. 2.

It is appreciated, of course, that the deflector assembly 22 and the sidewall 24 may be formed as separate components. In some embodiments, the deflector assembly 22 is formed integrally as a one-piece monolithic structure. Specifically, the base portion 44 and the deflector 46 may be integrally molded as a one-piece monolithic structure. In some other embodiments, the deflector assembly 22 may be molded as an integrally formed one-piece monolithic structure with the fuel housing 16. Specifically, the deflector assembly 22 may be integrally molded as a one-piece monolithic structure with the sidewall 24.

The above described fuel housing assemblies provide a deflector assembly that deflects contact of a fuel nozzle boot of a fuel nozzle from contacting a locking pin of a fuel door locking assembly. As contact between the fuel nozzle boot and the locking pin is inhibited, the fuel nozzle boot cannot move the locking pin from the extended position (unlocked configuration) to the retracted position (locked configuration). Further, as contact between the fuel nozzle boot and the locking pin is inhibited, the fuel door sensor detects that that the locking pin is in the extended position and the electronic control unit determines that the fuel door is in the open position and the movement of the fuel cutoff valve from the open position to the closed position during fueling operation is prevented.

While the deflector assemblies are illustrated above in the context of a fuel housing assembly, the deflector assemblies may be used with other assemblies, such as an electric car charging port door for an electric vehicle.

In some embodiments, the vehicle 10 is a car. In other embodiments, the vehicle 10 may be a truck, a sport utility vehicle, a tuck, a van, a boat, a plane or other vehicle types. It should be noted that the fuel housing assembly 14 may be located at any suitable location on the vehicle 10, such as the front, rear, diver's side or passenger's side. Further, the fuel door 18 may open in a number of ways, such as rear-to-front or front-to-rear.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A fuel housing assembly for a vehicle, the fuel housing assembly comprising:
   a fuel housing having a sidewall and an interior wall defining a fuel nozzle receiving cavity for receiving a fuel nozzle having a fuel nozzle boot;
   a fuel door locking assembly having a locking pin moveable between an extended position and a retracted position; and
   a deflector assembly having a base portion and a deflector, the base portion is connected to the sidewall, the deflector extends outwardly from the base portion to extend beyond the locking pin to deflect the fuel nozzle boot from contacting the locking pin with the locking pin in the extended position.

2. The fuel housing assembly of claim 1, wherein the base portion includes an opening, the locking pin extends through the opening of the base portion.

3. The fuel housing assembly of claim 2, wherein the deflector includes an offset portion that at least partially surrounds the opening formed in the base portion.

4. The fuel housing assembly of claim 3, wherein the offset portion includes an upper surface spaced apart from the opening formed in the base portion, and
   wherein the deflector includes at least one rib that extends outwardly from the upper surface of the offset portion, the at least one rib extends beyond the locking pin with the locking pin in the extended position.

5. The fuel housing assembly of claim 4, wherein the at least one rib is a pair of ribs, each of the pair of ribs extends outwardly from the upper surface of the offset portion.

6. The fuel housing assembly of claim 5, wherein the pair of ribs are spaced apart in a vehicle-lateral direction to receive a locking plate of a fuel door.

7. A fuel housing assembly for a vehicle, the fuel housing assembly comprising:
   a fuel door having a locking plate;
   a fuel housing having a sidewall and an interior wall defining a fuel nozzle receiving cavity for receiving a fuel nozzle having a fuel nozzle boot;
   a fuel door locking assembly having a locking pin, the fuel door locking assembly having a locked configuration and an unlocked configuration, in the locked configuration the locking pin is in a retracted position and engaged with the locking plate to inhibit opening of the fuel door, in the unlocked position the locking pin is in an extended position and disengaged from the locking plate to allow opening of the fuel door;
   a deflector assembly having a base portion and a deflector, the base portion is connected to the sidewall, the deflector extends outwardly from the base portion to extend beyond the locking pin to deflect the fuel nozzle boot from contacting the locking pin with the locking pin in the extended position.

8. The fuel housing assembly of claim 7, wherein the base portion includes an opening, the locking pin extends through the opening of the base portion.

9. The fuel housing assembly of claim 8, wherein the deflector includes an offset portion that at least partially surrounds the opening formed in the base portion.

10. The fuel housing assembly of claim 9, wherein the offset portion includes an upper surface spaced apart from the opening formed in the base portion, and
    wherein the deflector includes at least one rib that extends outwardly from the upper surface of the offset portion, the at least one rib extends beyond the locking pin in the extended position.

11. The fuel housing assembly of claim 10, wherein the at least one rib is a pair of ribs, each of the pair of ribs extends outwardly from the upper surface of the offset portion.

12. The fuel housing assembly of claim 11, wherein the pair of ribs are spaced apart.

13. The fuel housing assembly of claim 12, wherein a portion of the locking plate is positioned between the pair of ribs of the deflector when the fuel door is in a closed position.

14. A vehicle comprising:
    a fuel door having a locking plate;
    a fuel door locking assembly having a locking pin, the fuel door locking assembly having a locked configuration and an unlocked configuration, in the locked configuration the locking pin is in a retracted position and engaged with the locking plate to inhibit opening of the fuel door, in the unlocked position the locking pin is in an extended position and disengaged from the locking plate to allow opening of the fuel door;

a body panel;

a fuel housing connected to the body panel, the fuel housing having a sidewall and an interior wall defining a fuel nozzle receiving cavity for receiving a fuel nozzle having a fuel nozzle boot; and a deflector assembly having a base portion and a deflector, the base portion is connected to the sidewall, the deflector extends outwardly from the base portion to extend beyond the locking pin to deflect the fuel nozzle boot from contacting the locking pin with the locking pin in the extended position.

15. The vehicle of claim 14, wherein the base portion includes an opening, the locking pin extends through the opening of the base portion.

16. The vehicle of claim 15, wherein the deflector includes an offset portion that at least partially surrounds the opening formed in the base portion.

17. The vehicle of claim 16, wherein the offset portion includes an upper surface spaced apart from the opening formed in the base portion, and wherein the deflector includes at least one rib that extends outwardly from the upper surface of the offset portion, the at least one rib extends beyond the locking pin in the extended position.

18. The vehicle of claim 17, wherein the at least one rib is a pair of ribs, each of the pair of ribs extends outwardly from the upper surface of the offset portion.

19. The vehicle of claim 18, wherein the pair of ribs are spaced apart in a vehicle-lateral direction to receive the locking plate of the fuel door.

20. The vehicle of claim 19, wherein a portion of the locking plate is positioned between the pair of ribs of the deflector when the fuel door is in a closed position.

* * * * *